US012163355B2

(12) United States Patent
Wehr

(10) Patent No.: US 12,163,355 B2
(45) Date of Patent: Dec. 10, 2024

(54) PORTABLE U-LOCK

(71) Applicant: ABUS August Bremicker Söhne KG, Wetter-Volmarstein (DE)

(72) Inventor: Michel Wehr, Willingen (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 272 days.

(21) Appl. No.: 17/639,485

(22) PCT Filed: Aug. 20, 2020

(86) PCT No.: PCT/EP2020/073421

§ 371 (c)(1),
(2) Date: Mar. 1, 2022

(87) PCT Pub. No.: WO2021/043592

PCT Pub. Date: Mar. 11, 2021

(65) Prior Publication Data

US 2022/0251877 A1 Aug. 11, 2022

(30) Foreign Application Priority Data

Sep. 2, 2019 (DE) ..................... 10 2019 123 477.8

(51) Int. Cl.

*E05B 47/00* (2006.01)
*E05B 45/06* (2006.01)
*E05B 71/00* (2006.01)
*G08B 3/00* (2006.01)

(52) U.S. Cl.

CPC .......... *E05B 47/0012* (2013.01); *E05B 45/06* (2013.01); *E05B 71/00* (2013.01);
(Continued)

(58) Field of Classification Search

CPC ...... E05B 47/0012; E05B 45/06; E05B 71/00; E05B 2047/0017; E05B 2047/0058; E05B 2047/0067
(Continued)

(56) References Cited

U.S. PATENT DOCUMENTS

2011/0041570 A1* 2/2011 Huang ................ E05B 37/0034 70/21
2014/0266588 A1* 9/2014 Majzoobi ................ B62H 5/20 340/5.61
(Continued)

FOREIGN PATENT DOCUMENTS

CN 102842161 A * 12/2012 ......... E05B 47/0012
CN 104234543 A 12/2014
(Continued)

OTHER PUBLICATIONS

Chinese Office Action received from the Chinese Patent Office for related Chinese Patent Application No. 202080058709.0 dated Feb. 13, 2023, 8 pages.
(Continued)

*Primary Examiner* — Eugene G Byrd
*Assistant Examiner* — James Edward Ignaczewski
(74) *Attorney, Agent, or Firm* — Dickinson Wright PLLC

(57) ABSTRACT

A portable hoop lock comprises a lock body that accommodates an electromechanical locking mechanism; and a hoop that has at least one locking section that can be selectively introduced into the lock body or released from the lock body, wherein the locking mechanism comprises at least one latch and an electric motor for driving the latch, wherein the latch is configured to lock the locking section of the hoop introduced into the lock body to the lock body in a locking position and to release the locking section of the hoop for a removal from the lock body in a release position. In this
(Continued)

Figure 1:
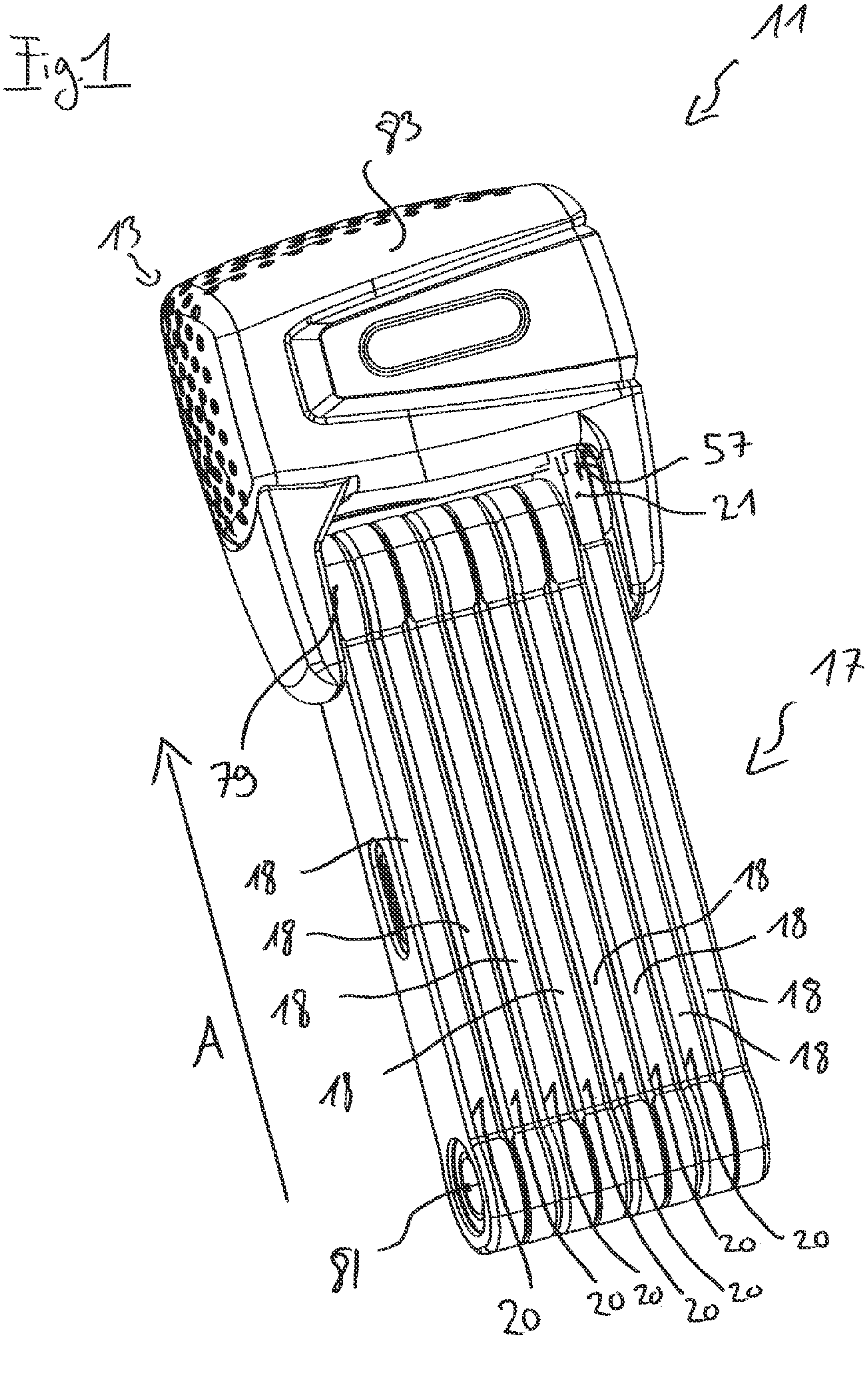

respect, the electric motor is configured to selectively move the latch from the locking position into the release position via a drive transmission section of the locking mechanism and the lock body has a watertight cover that surrounds the electric motor.

16 Claims, 16 Drawing Sheets

(52) U.S. Cl.
CPC ................. *E05B 2047/0017* (2013.01); *E05B 2047/0058* (2013.01); *E05B 2047/0067* (2013.01); *G08B 3/00* (2013.01)

(58) Field of Classification Search
USPC .......................................................... 70/233
See application file for complete search history.

(56) References Cited

U.S. PATENT DOCUMENTS

| | | | | |
|---|---|---|---|---|
| 2018/0258668 | A1* | 9/2018 | Buseman | E05B 71/00 |
| 2019/0047646 | A1* | 2/2019 | Mohamed | B62H 5/003 |
| 2019/0049646 | A1* | 2/2019 | Wang | G02B 27/283 |
| 2019/0226241 | A1* | 7/2019 | Long | E05B 47/0012 |

FOREIGN PATENT DOCUMENTS

| | | | | | |
|---|---|---|---|---|---|
| CN | 104695769 | B | | 4/2017 | |
| CN | 104695769 | A | * | 6/2017 | |
| CN | 107956318 | A | | 4/2018 | |
| CN | 108571239 | A | | 9/2018 | |
| CN | 208473501 | U | | 2/2019 | |
| DE | 102005063514 | B4 | * | 6/2010 | E05B 67/003 |
| DE | 102016104674 | A1 | * | 9/2017 | |
| DE | 102018111296 | A1 | | 11/2019 | |
| EP | 3372762 | A1 | | 9/2018 | |
| KR | 101349951 | B1 | | 1/2014 | |
| WO | 2014012677 | A2 | | 1/2014 | |
| WO | WO-2019047494 | A1 | * | 3/2019 | E05B 47/0012 |

OTHER PUBLICATIONS

German Search Report for DE102019123477.8 dated Jun. 18, 2020, 7 pages.
International Search Report for PCT/EP2020/073421 dated Nov. 16, 2020, 4 pages.

* cited by examiner

PORTABLE U-LOCK

CROSS-REFERENCE TO RELATED APPLICATIONS

This application is a U.S. National Stage of International Patent Application Serial No. PCT/EP2020/073421, filed Aug. 20, 2020, which claims the benefit of German Patent Application Serial No. 102019123477.8, filed Sep. 2, 2019. The entire disclosures of each of the above applications are incorporated herein by reference.

The invention relates to a portable hoop lock comprising a lock body that accommodates an electromechanical locking mechanism; and a rigid or flexible hoop that has at least one locking section that may be selectively introduced into the lock body or released from the lock body. In this respect, the locking mechanism comprises at least one latch and an electric motor for driving the latch, wherein the latch is configured to lock the locking section of the hoop introduced into the lock body to the lock body in a locking position and to release the locking section of the hoop for a removal from the lock body in a release position.

Such portable hoop locks may, for example, be used to secure objects moved between different locations, and in particular two-wheelers, against an unauthorized removal. For this purpose, the hoop may, for example, be led in the manner of a loop around a section of a two-wheeler, such as a frame section, and around a stationary object, such as a bicycle stand, to securely connect the two-wheeler to the stationary object after a locking of the locking section to the lock body. Alternatively thereto, two-wheelers may be secured against an unauthorized riding away by leading the loop, which is formed by the hoop, through the spokes of one of the wheels such that its movement is limited.

Furthermore, such portable hoop locks may be used for a locking of doors by, for example, leading the hoop through the eyelet of a hasp and then locking the locking section to the lock body. Tailgates of trucks, container doors, or doors of smaller buildings, such as doors of sheds for storing tools, may in particular be securely closed by means of such locks.

The design of such a portable hoop lock having an electromechanical locking mechanism makes it possible to extend the functionality of the hoop lock and in particular also to make the handling for locking or unlocking as comfortable as possible for a user. However, on a use of electronic components for a selective unlocking and/or locking of the introduced locking section, there is generally a risk that these components may be damaged by a penetration of water or of contamination such as dirt into the interior of the lock body and that the hoop lock may thereby lose functionality and may no longer be operated under certain circumstances. This problem is highly relevant in view of the generally intended outdoor use, for example, for the securing of two-wheelers or exterior doors of smaller buildings, particularly with respect to portable hoop locks.

It is therefore an object of the invention to provide a portable hoop lock having an electromechanical locking mechanism and to protect the latter in a simple manner against contamination or damage by liquid or contamination entering into the interior of the lock body.

This object is satisfied by a portable hoop lock having the features of claim 1 and in particular in that the electric motor is configured to selectively move the latch from the locking position into the release position via a drive transmission section of the locking mechanism, and in that the lock body has a watertight cover that surrounds the electric motor.

The invention thus relates in a general manner to a portable hoop lock comprising a lock body that accommodates an electromechanical locking mechanism; and a rigid or flexible hoop that has at least one locking section that may be selectively introduced into the lock body or released from the lock body, wherein the locking mechanism comprises at least one latch and an electric motor for driving the latch, wherein the latch is configured to lock the locking section of the hoop introduced into the lock body to the lock body in a locking position and to release the locking section of the hoop for a removal from the lock body in a release position, wherein the electric motor is configured to selectively move the latch (at least) from the locking position into the release position via a drive transmission section of the locking mechanism, and wherein the lock body has a watertight cover that surrounds the electric motor.

Since the electric motor of the locking mechanism of the portable hoop lock is arranged within a watertight cover, the electric motor may be protected against damage by external and in particular weather-related influences such as rainwater or also dust. The electric motor and optionally also further components of the locking mechanism, in particular electrical components, may be surrounded in an at least substantially watertight manner, and may thus be sealed in a water-impermeable manner, by the cover.

In the context of the invention, said watertight design of the cover and the resulting sealing in particular relate to a use of the hoop lock at atmospheric pressure.

In this respect, the hoop of the portable hoop lock may be rigid or flexible and/or may be formed as an elongate structure having a first end and a second end. The hoop may be permanently connected (in a rigid or movable manner) to the lock body at one end or it may be completely releasable from the lock body in the unlocked state. The hoop may have a respective locking section at one or at two ends, said locking section(s) being introducible into and locked to the lock body. Correspondingly, one or two latches may in particular also be provided for locking the locking section or the locking sections and may be selectively moved from the locking position into the release position by the electric motor via a common or a respective drive transmission section.

Such a portable hoop lock may, for example, be configured as a so-called joint lock and may comprise a jointed bar hoop that has a plurality of jointed bars pivotably connected to one another. One of these jointed bars may in particular be fixedly connected to the lock body, wherein the locking section, which is also designated as a locking bar in such locks, is formed at a free end of the jointed bar hoop and may be selectively introduced into or released from the lock body, wherein the introduced locking section may be locked to the lock body by the latch or may be released for a removal from the lock body. Such a portable hoop lock configured as a joint lock is in particular suitable for securing two-wheelers. For this purpose, the free end of the jointed bar hoop forming the locking section may first be led through a section of the two-wheeler and around a stationary object such that the two-wheeler is securely connected to the stationary object by the loop formed by the jointed bar after the locking of the locking section.

Similarly, such a portable hoop lock may be configured as a U hoop lock and may have a rigid, at least substantially U-shaped hoop. Such a U hoop may, for example, have two limbs of equal length that may be selectively introduced into a respective introduction opening of the lock body and may be locked to the lock body by means of two associated latches. Alternatively, provision may be made to form a U hoop with a long limb and a short limb. In this respect, it is, for example, possible that in the unlocked and open state of the U hoop, the long limb remains in an associated introduction opening of the lock body while the short limb is completely removed from the introduction opening associated therewith. Thus, the U hoop may be pivoted about the long limb and the short limb may be led through a section of an object to be secured such as an eyelet of a hasp. Both the short limb and the long limb may again be locked to the lock body by means of associated latches when both limbs are completely introduced into the lock body.

Furthermore, the hoop of a portable hoop lock may, for example, be configured as a rope hoop, in particular as a wire rope hoop, or as a chain hoop, wherein at least one of the ends of such a cable hoop or chain hoop may be releasable from the lock body and may, for example, be connected to a bolt that may be introduced into the lock body as a locking section and that may be selectively locked to the lock body by means of a latch.

In general, further designs of rigid or flexible hoops of portable hoop locks are also possible.

An automatic locking mechanism may be provided for the locking of the hoop to the lock body (automatic locking solely due to the introduction of the locking section of the hoop into the lock body, for example, due to a spring-preloaded latch). Alternatively, the electric motor may also be configured to selectively move the latch from the release position into the locking position or from the locking position into the release position, in particular based on corresponding electrical control commands.

The cover may be flexible and may in particular be elastically deformable. For this purpose, the cover may, for example, be designed as a watertight shaped part and may in particular be produced from plastic, for example, from silicone. Furthermore, the cover may be formed as a two-component plastic part or as a thin plastic film, wherein the cover may also be inelastically deformable. Furthermore, the cover may have a certain inherent stability such that the cover remains in a predefined shape during the intended use of the hoop lock and, for example, during a transport.

In general, the cover may surround further components, and in particular all the electrical components of the portable hoop lock, in addition to the electric motor. It is nevertheless possible to lock the introduced locking section or the introduced locking sections of the hoop outside the cover by the latch or latches brought into the locking position. Accordingly, the latch or latches that may be driven by an electric motor may be arranged partly or completely outside the cover at least in the locking position in order to lock the hoop to the lock body.

To enable a driving of the latch by the electric motor arranged within the cover, the electric motor drives the drive transmission section that may thus serve to transmit the drive power generated by the electric motor out of the cover. In this respect, the drive transmission section of the locking mechanism may be configured as a transmission element or a coupling element separate from the latch, in particular when the latch is arranged completely outside the cover. Alternatively, the drive transmission section may be configured as an integral section of the latch, i.e. in one part with the latch, in particular when the latch is partly arranged within the cover or projects into the cover.

Further embodiments of the invention may be seen from the dependent claims, from the description, and from the Figures.

In some embodiments, the cover may have at least one cover opening through which the drive transmission section of the locking mechanism projects in a sealed manner. Such a cover opening makes it possible to transmit the drive power generated by the electric motor within the cover to a part of the latch or latches disposed outside the cover. Since the drive transmission section of the locking mechanism projects through the cover opening in a sealed manner, water or contamination may be prevented from entering the interior of the cover through the cover opening. In this respect, the sealing may be adapted to a movement of the latch or of the drive transmission section, for example to a rotational movement or to a translational movement, to achieve a reliable sealing in the different latch positions and during the movement of the latch or of the drive transmission section.

The lock body may have a support section having a support opening in which the drive transmission section of the locking mechanism is movably supported and which is aligned with the cover opening, wherein the support opening and the cover opening may, however, have different diameters. The cover may be held sealed in an at least substantially water-impermeable manner at the support section, wherein at least one sealing element is provided that is arranged between the drive transmission section and a peripheral boundary of the support opening, wherein the support opening is closed and sealed in an at least substantially water-impermeable manner by the drive transmission section and the sealing element. The sealing element may, for example, be configured as a sealing ring. In this respect, said support section of the lock body may be arranged within or outside the cover and may in particular support the drive transmission section radially with respect to the direction in which the drive transmission section passes through the cover opening and the support opening. Furthermore, the lock body may have a housing that comprises the support section or to which the support section is fixedly connected. The support section may in particular be formed by a connection section of a carrier, which is arranged within the cover, for the electric motor and/or by a counter connection section arranged outside the cover.

Since the cover is connected sealed in a substantially water-impermeable manner to the support section or is held at the support section, a passage of water at this connection may be reliably prevented. For this purpose, the cover may, for example, be bonded in a watertight manner to the support section or connected to the support section by means of one or more fixing elements or pressed onto the support section. Since the support opening holds the drive transmission section and is closed and sealed by the drive transmission section and the sealing element, it may be achieved that the interior of the cover is sealed in an at least substantially water-impermeable manner despite the cover opening present. A drive power generated by the electric motor may thus be transmitted to a section of the latch disposed outside the cover without the components of the locking mechanism disposed within the cover being subject to the risk of contamination or damage by entering liquids. Further embodiments in this regard will be explained in more detail in the following.

In some embodiments, the lock body may comprise a carrier that carries at least a part of the locking mechanism and that is surrounded by the cover. Such a carrier makes it possible to arrange at least parts of the locking mechanism on said carrier and to fixedly connect them thereto such that these parts are held in a defined position in a vibration-resistant manner in the lock body and within the cover.

The carrier may carry the electric motor and movably support the drive transmission section. The position of the electric motor may in particular thereby be clearly defined and it may be ensured that the electric motor always remains reliably and stably in a correct position within the cover during a long-term use of the portable hoop lock and also during a transport thereof. The drive transmission section may further in particular be supported at the carrier in a radial direction with respect to its direction of passage through the cover opening such that, for example, forces applied to the drive transmission section from a radial direction during a break-open attempt may be absorbed by the carrier without acting directly on the components arranged within the cover and in particular on the electric motor. Furthermore, the carrier may thus form a secure guide of the drive transmission section during a movement of the latch.

The cover may have a clamping section that peripherally surrounds the cover opening, wherein the carrier may have a connection section that contacts an inner side of the clamping section of the cover and that has a connection opening. In this respect, the lock body may have a counter connection section that contacts an outer side of the clamping section of the cover and that has a counter connection opening, wherein the clamping section of the cover is arranged between the connection section of the carrier and the counter connection section of the lock body and the drive transmission section of the locking mechanism projects through the connection opening of the carrier, the cover opening, and the counter connection opening of the lock body. The connection opening of the carrier, the cover opening, and the counter connection opening of the lock body may be aligned with one another for this purpose, but have different diameters. Both the carrier and its connection section and the counter connection section may be produced from metal and protect the locking mechanism from external access.

The connection section of the carrier may in particular extend perpendicular to or offset in parallel from a carrier section of the carrier on which at least some of the components of the locking mechanism and in particular the electric motor are arranged. In this respect, the carrier may in particular form an inner housing of the hoop lock that is surrounded by the cover and that protects the components arranged on the carrier against damage by an external force development.

In such embodiments, the connection section of the carrier may be connected to the counter connection section such that the clamping section of the cover is clamped between the connection section of the carrier and the counter connection section of the lock body and is thereby in particular compressed. The clamping section of the cover thus closes the gap arising between the connection section and the counter connection section and seals the gap to particularly reliably prevent a penetration of water into the interior of the cover at this point.

The clamping section of the cover may thus in particular be arranged in a clamping gap that is formed between the connection section of the carrier and the counter connection section of the lock body, wherein the counter connection section of the lock body and the connection section of the carrier are fixed to one another in such a force-fitting manner that the clamping section of the cover is clamped in the clamping gap and the clamping gap is sealed in an at least substantially water-impermeable manner by the clamping section of the cover.

For this purpose, the clamping section of the cover may, for example, be pressed via a sealing edge that may be formed at the connection section of the carrier or at the counter connection section of the lock body.

The lock body may, as already mentioned, have at least one sealing element that is arranged between the drive transmission section of the locking mechanism and a peripheral boundary of the connection opening of the connection section of the carrier and/or a peripheral boundary of the counter connection opening of the counter connection section of the lock body, wherein the connection opening and/or the counter connection opening is/are closed and sealed in an at least substantially water-impermeable manner by the drive transmission section and the sealing element.

The connection opening aligned with the cover opening and the counter connection opening aligned with the connection opening may again be provided to be able to transmit the driving power generated by the electric motor within the cover to a section of the latch that is arranged outside the cover at least in the locking position and that serves to lock the locking section of the hoop introduced into the lock body. The gap arising between the connection section of the carrier and the counter connection section of the lock body may be sealed in a water-impermeable manner by the clamping section of the cover. Since at least the connection opening or the counter connection opening may now be closed and sealed in an at least substantially water-impermeable manner by the drive transmission section and the sealing element, an entry of liquid into the interior of the cover through these openings may be prevented. In general, it may in this respect be sufficient to seal only the connection opening or the counter connection opening by the drive transmission section and a sealing element, while provision may also be made to arrange sealing elements at both openings and to seal both openings in a water-impermeable manner.

The sealing element may be adapted to a movement of the drive transmission section during a movement of the latch from the locking position into the release position to reliably seal the respective opening in both latch positions and during the movement of the latch. In this respect, adaptations of the sealing element to rotational movements or translational movements may in particular be considered, for which purpose the sealing element may, for example, be configured as a sealing ring (also designated as an O-ring).

In some embodiments, the counter connection section of the lock body may be fixed to the connection section of the carrier by means of a fixing element. For example, the counter connection section and the connection section of the carrier may be screwed to one another and the clamping section of the cover may be clamped by this screw connection into the clamping gap arising between the counter connection section and the connection section.

The lock body may comprise a housing that surrounds the cover, wherein the carrier and the counter connection section may be fixed in or at the housing by the fixing element. Thus, the fixing element first makes it possible to connect the counter connection section to the connection section of the carrier. Furthermore, the same fixing element may also be used to fixedly connect the counter connection section and the carrier to the housing such that the carrier and the counter connection section are held in the housing and are arranged in a predefined manner. The parts of the locking mechanism arranged on the carrier may thus also be fixedly positioned in a predefined manner within the lock body. Furthermore, the cover, which may, for example, be deformable, may also be arranged fixed to the housing by the fixing element and by the clamping of the cover between the connection section of the carrier and the counter connection section of the lock body.

Alternatively to such a connection of the counter connection section to a housing of the lock body by the fixing element, provision may in particular also be made to form the counter connection section as an integral section of the housing and in one part therewith.

As regards the design of the lock body outside the watertight cover, provision may be made that the counter connection section of the lock body peripherally surrounds the introduced locking section of the hoop with respect to a longitudinal axis of said locking section. The locking section introduced into the lock body may hereby be protected from external access and movements of the locking section within the lock body may be limited. Manipulation attempts may thereby in particular be counteracted that aim at moving the locking section of the hoop locked within the lock body away from the latch and out of engagement with the latch in order thereby to be able to remove the locking section from the lock body.

The lock body may have an introduction passage into which the locking section of the hoop may be introduced, wherein the latch projects into the introduction passage of the lock body in the locking position. In this respect, in the locking position, the latch may engage into a section of the introduced locking section provided for this purpose and may thereby secure this section against a release from the lock body. In general, the latch may perform a rotational or a translational movement for a transfer from the locking position into the release position such that it is also possible for the latch to also project into the introduction passage in the release position and for the locking position to differ from the release position only by the rotational position of the latch.

The latch may be moved from the locking position into the release position by a rotation, in particular by a rotation about 90° (90 angular degrees). During such a transfer from the locking position into the release position and vice versa if applicable, the latch may in particular solely perform a rotational movement without a translational movement component. Alternatively thereto, provision may, however, also be made that the latch performs a translational (i.e. a linear) and in particular a purely translational movement without a rotational movement component during a transfer from the release position into the locking position and vice versa, wherein a rotation generated by the electric motor may be converted into a translational movement of the latch via the drive transmission section of the locking mechanism that may, for example, be configured as a helical ramp.

In some embodiments, the latch may have an engagement section that has a longitudinal extent having an effective length and an effective width in a plane perpendicular to a movement axis of the latch, wherein the locking section has an elongate passage channel whose (clear) width is greater than the effective width, but less than the effective length of the engagement section of the latch. In this respect, the passage channel may be open at a first end that may correspond to a free end of the hoop. The passage channel may lead into a latch receiver of the locking section at a second end, the clear width of said latch receiver in a direction perpendicular to a longitudinal direction of the passage channel being greater than the (clear) width of the passage channel and than the effective length of the engagement section of the latch. In the release position of the latch, the elongate engagement section of the latch is oriented longitudinally to the passage channel such that, during an introduction of the locking section into the lock body, the engagement section indeed engages into the passage channel of the locking section, but allows an introduction movement of the locking section (wherein the passage channel of the locking section receiving the engagement section of the latch moves along the engagement section of the latch). In the locking position of the latch, the elongate engagement section of the latch is, in contrast, oriented transversely to the passage channel in such embodiments. The engagement section of the latch is hereby—after the locking section has been introduced into the lock body and while the engagement section engages into the latch receiver of the locking section—blocked against escaping into the (narrower) passage channel such that the locking section may not be removed from the lock body again and the hoop is locked to the lock body.

Provision may be made that the locking mechanism has a sensor that is arranged within the watertight cover and that is configured to detect an introduction of the locking section of the hoop into the lock body (closed position of the hoop) and to generate a corresponding detection signal. The lock body may have a movable actuation element for actuating the sensor that may be brought into activating contact with the sensor by the locking section of the hoop introduced into the lock body, wherein the actuation element is arranged outside the cover.

The sensor may in particular be configured to detect when the locking section of the hoop is in a position within the lock body in which it may be locked to the lock body. This information may, for example, be used to generate a control signal for the electric motor of the electromechanical locking mechanism in order to drive the latch to make a movement into the locking position. Since the sensor is surrounded in a watertight manner by the cover, the sensor may also be protected against external influences and in particular against damage by water. Due to a possibility of actuating the sensor via the actuation element through the watertight cover, it may be achieved that the actuation of the sensor also takes place without the risk of an entry of liquid or of a contamination. Due to the use of an actuation element, a defined action on the sensor may also be achieved without the risk of mechanical damage to the sensor by a direct contact with the locking section of the hoop.

In some embodiments, the actuation element may be configured to be driven to perform an actuation movement by the locking section of the hoop introduced into the lock body and may be configured to mechanically contact the sensor through the cover in order to bring about the generation of the detection signal. For example, the actuation element may for this purpose be configured as a rocker that is arranged in an end section of the path which the locking section describes during an introduction into the lock body and that may be tilted by a contact with the locking section of the hoop to actuate the sensor. In this respect, an actuation of the sensor may in particular only take place when the locking section is completely introduced into the lock body and is arranged in that position in which the locking may take place. To bring the actuation element out of contact with the sensor after or on a removal of the locking section, the actuation element may, for example, be spring-preloaded against the introduction direction of the locking section.

Furthermore, the sensor, which may in particular be configured as a mechanical contact switch, may be covered by a deformable section of the cover such that the actuation element may mechanically contact the contact switch by deforming the cover. Alternatively to a mechanical actuation of the sensor, provision may also be made to configure the sensor such that a contactless activating contact may be established by the actuation element when said actuation element is brought into the vicinity of the sensor by the introduced locking section.

The sensor may be connected to a control device that is configured to control the electric motor to move the latch into the locking position in response to the generated detection signal. The control device may in particular automatically control the electric motor to move the latch into the locking position such that a user only has to completely introduce the locking section of the hoop into the lock body, whereupon it is automatically locked without further measures on the part of the user being necessary.

As regards the further design of the portable hoop lock, the electromechanical locking mechanism may further comprise an electrical energy source that is arranged within the watertight cover, wherein the cover may have a watertight charging socket for charging the electrical energy source. Thus, the electrical energy source may also be arranged within the cover and may be protected against external influences without the opening in the cover, which is necessary for charging the energy source, enabling an entry of water.

Provision may further be made that the lock body comprises an alarm device that is arranged within the watertight cover and that has a loudspeaker for outputting an acoustic alarm signal, and/or that the lock body comprises a radio module that is arranged within the watertight cover and that is configured to wirelessly receive control commands for the electric motor.

Such an alarm device or such a radio module may in particular be at least partly arranged within the cover and may be surrounded by the cover in a watertight manner to also protect these electrical components against damage by liquids or contamination. Furthermore, the loudspeaker of such an alarm device may have a watertight membrane to seal an opening, which is formed in the cover, for the issuing of the acoustic alarm signal generated by the loudspeaker.

A radio module may in particular be provided to enable a user to wirelessly control the locking mechanism and accordingly to selectively set the latch or the latches for a locking of the introduced locking section or of the introduced locking sections of the hoop. Furthermore, information may also be transmitted to a user by means of the radio module to inform the user, for example, whether an introduced locking section of the hoop has been securely and correctly locked to the lock body.

In some embodiments, the cover may, as the only opening, at most comprise a charging socket for charging an electrical energy source arranged within the cover, a sound exit opening of an alarm device, an antenna passage opening of a radio module, one or more fixing openings that are penetrated by a respective fixing element of the type explained, and said cover opening for the drive transmission section. These openings of the cover may be sealed in an at least substantially watertight manner by their own sealing elements or in another manner, in particular by a force-fitting surrounding of the respective element by means of the elastically formed border of the respective opening. The number of openings of the cover may thus be minimized, wherein an entry of water or of contamination into the interior of the cover may be counteracted by the respective sealing of the openings provided.

Figure 2:
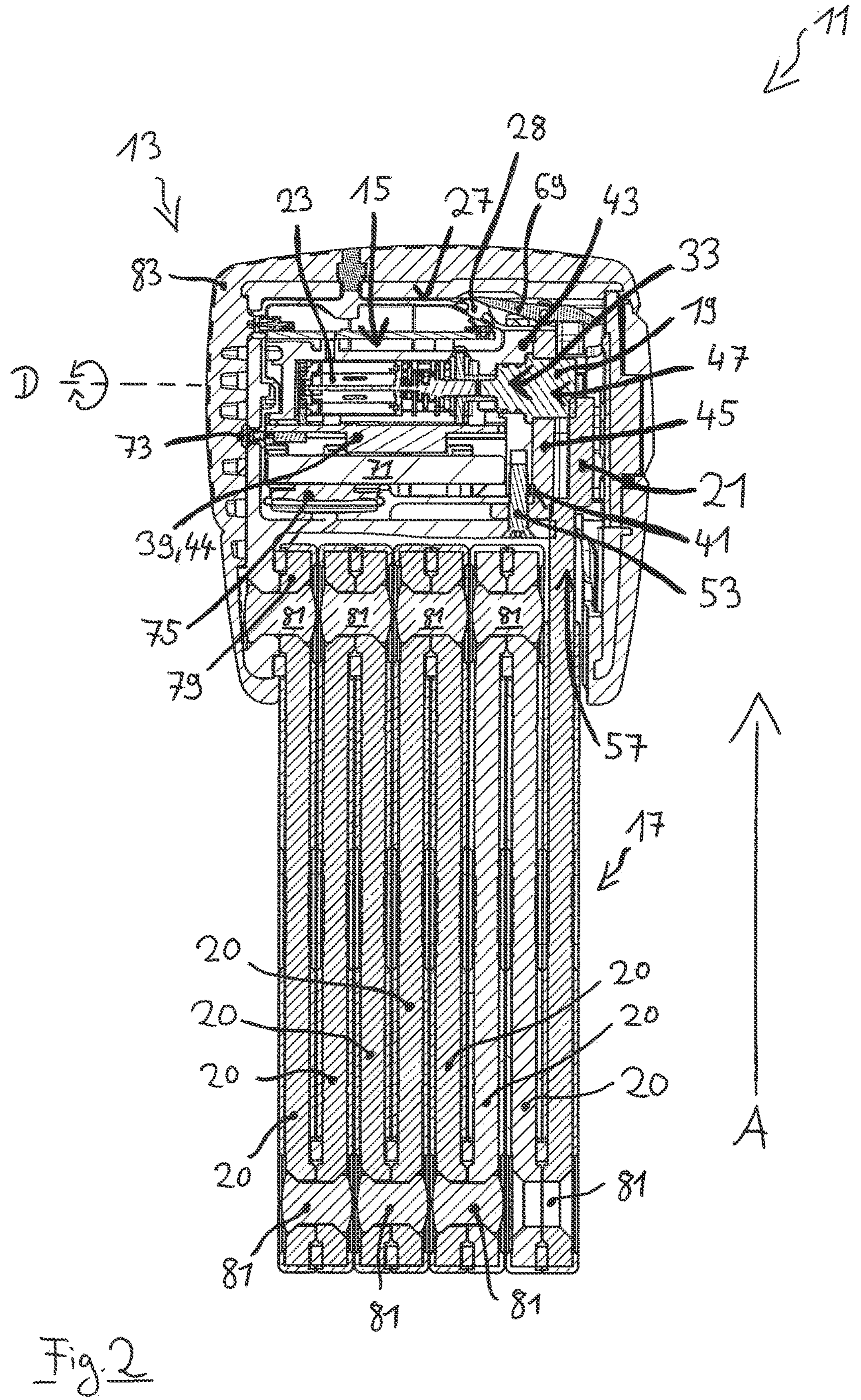
Figure 3:
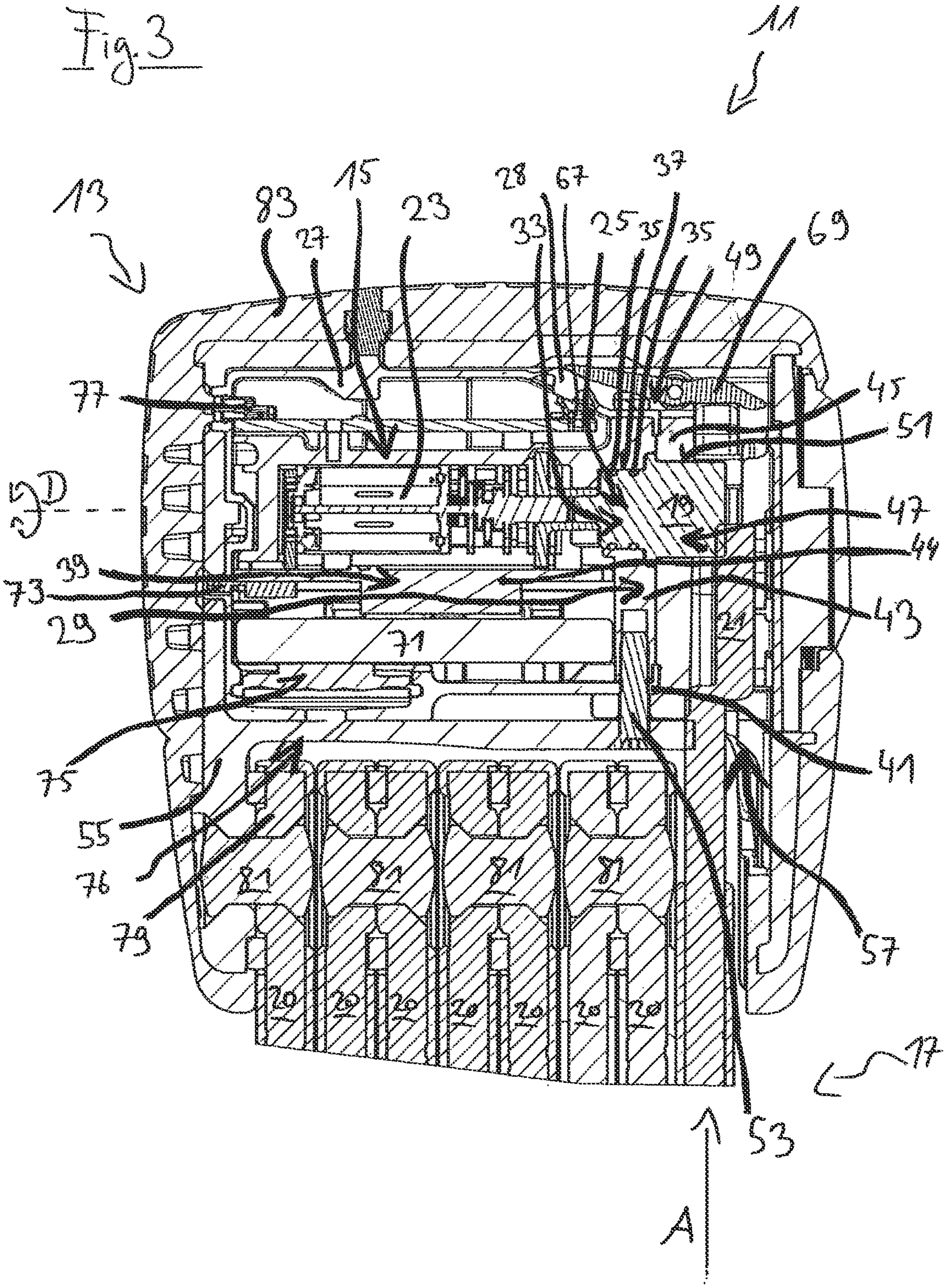
Figure 4:
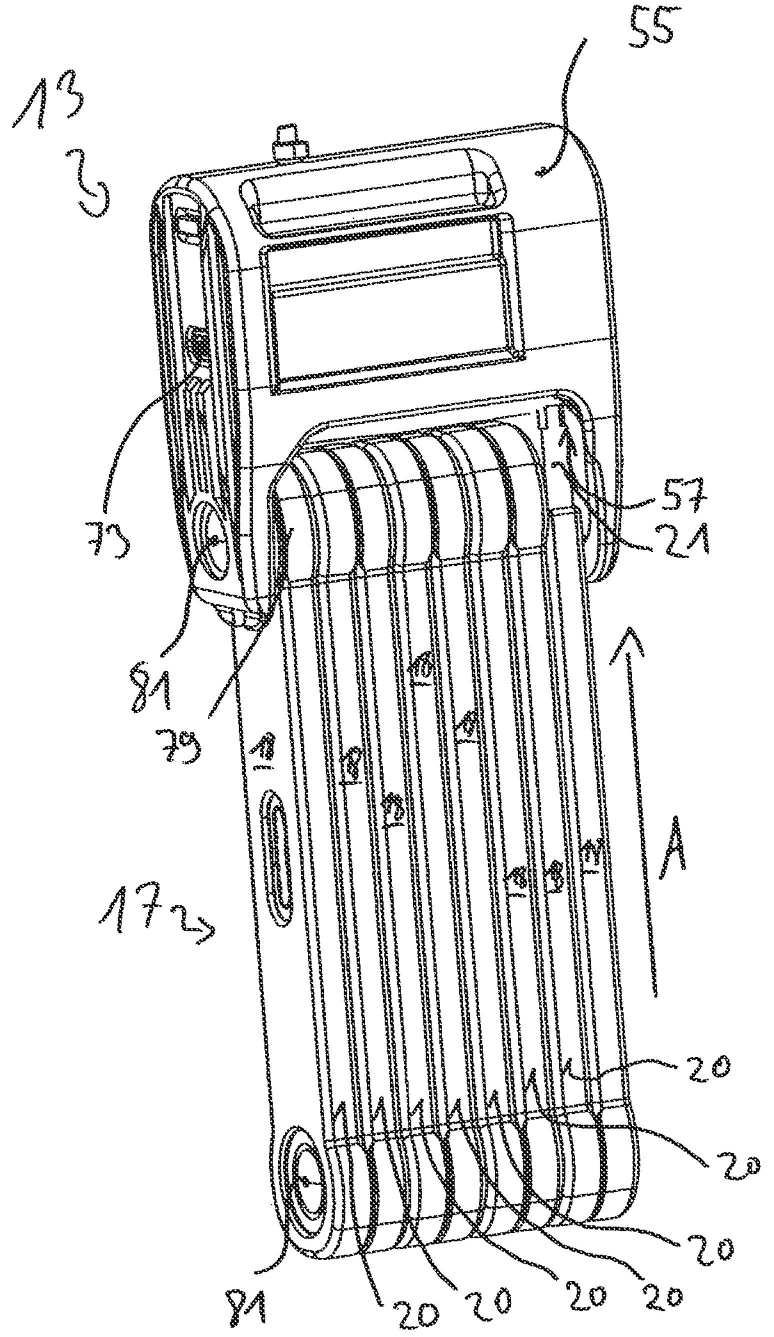
Figure 5:
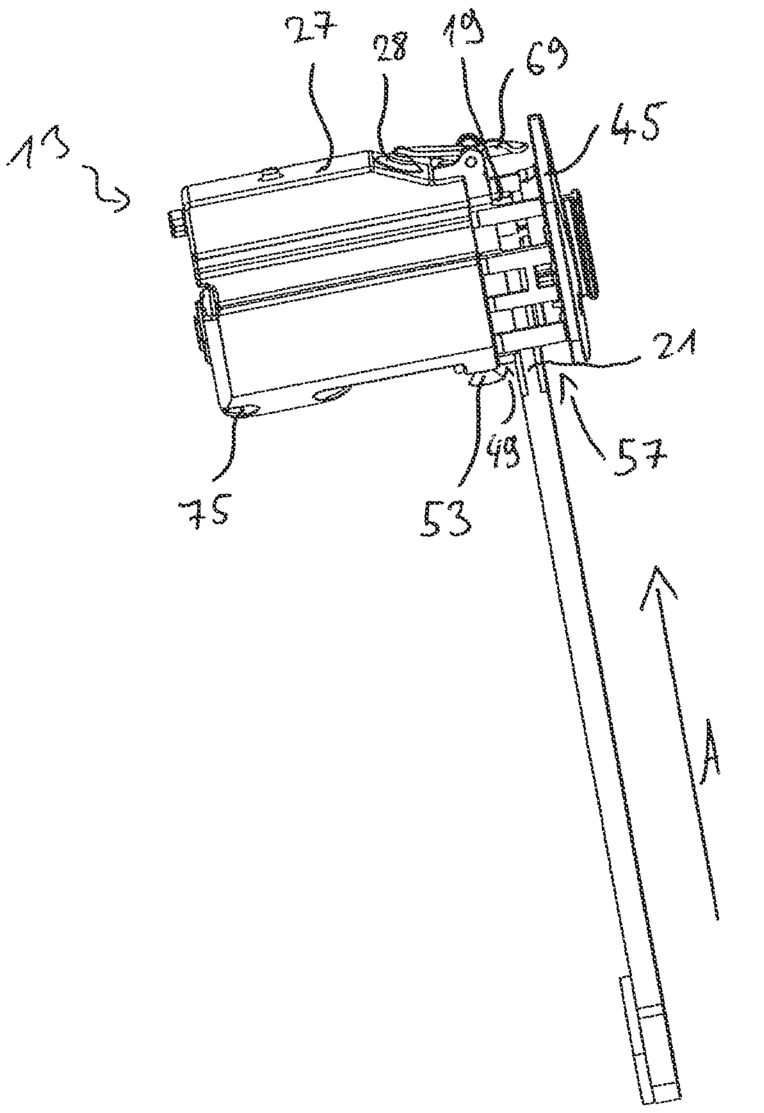
Figure 6:
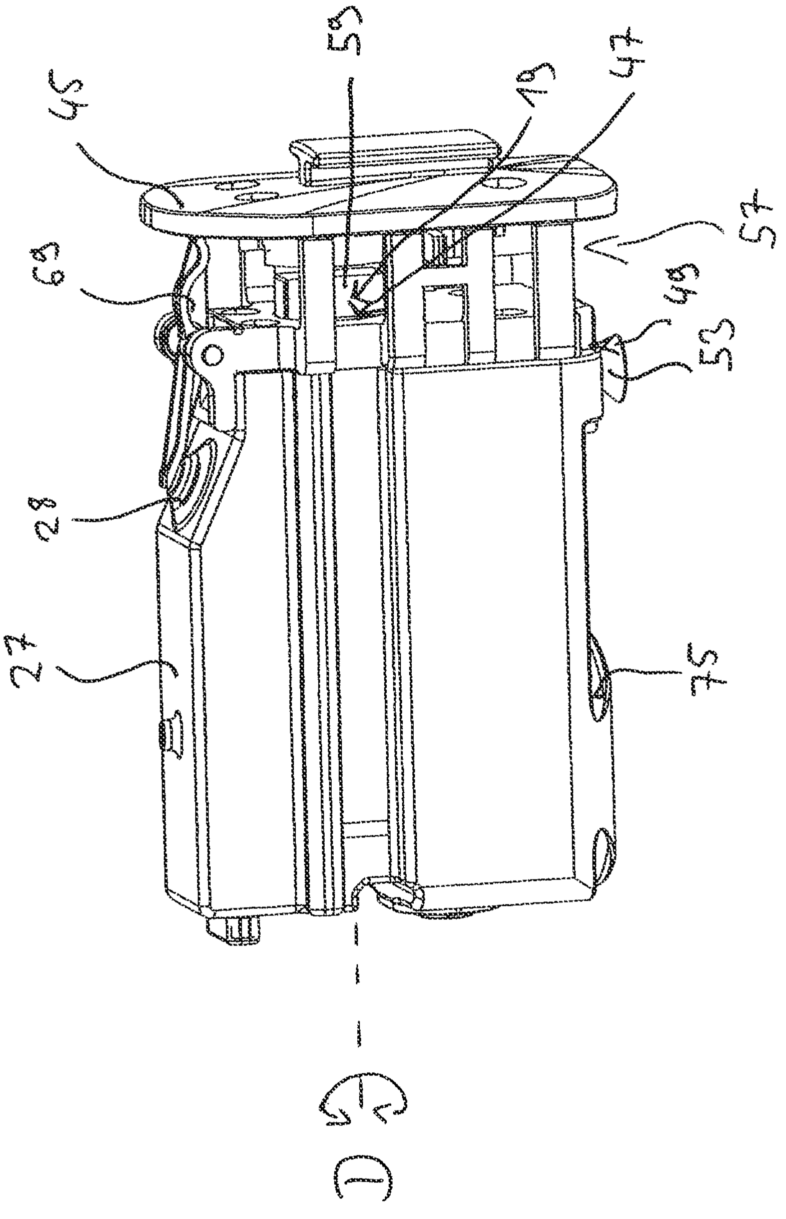
Figure 7A:
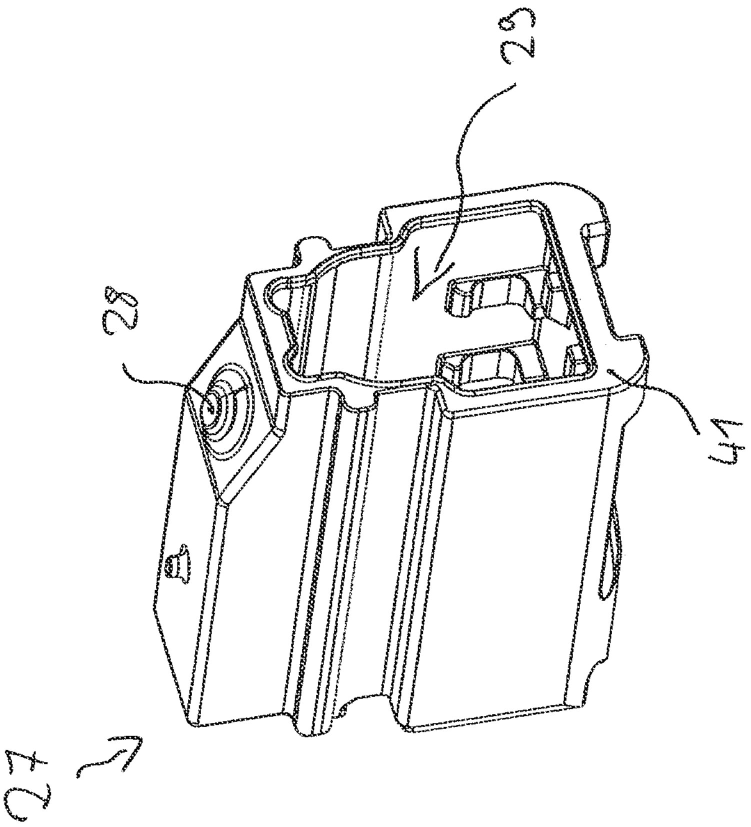
Figure 7B:
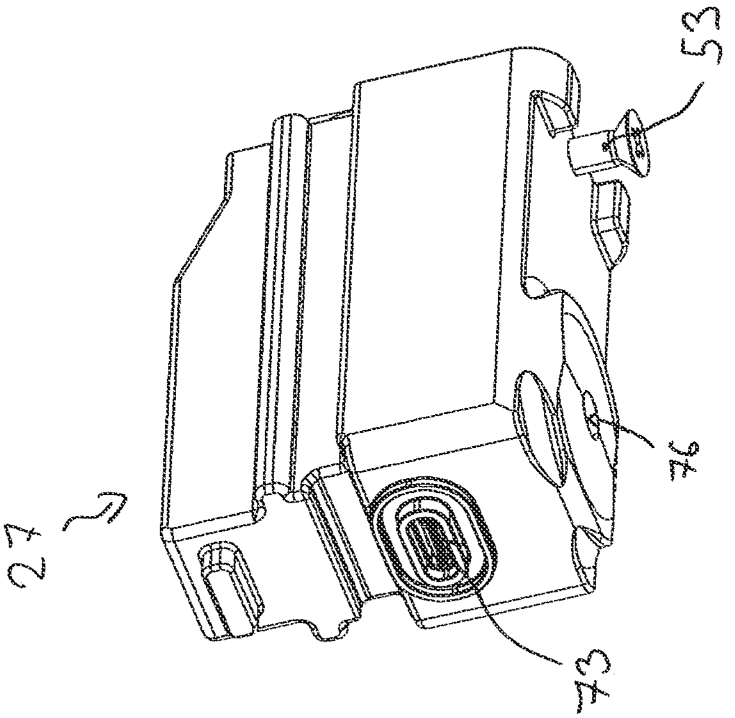
Figure 8A:
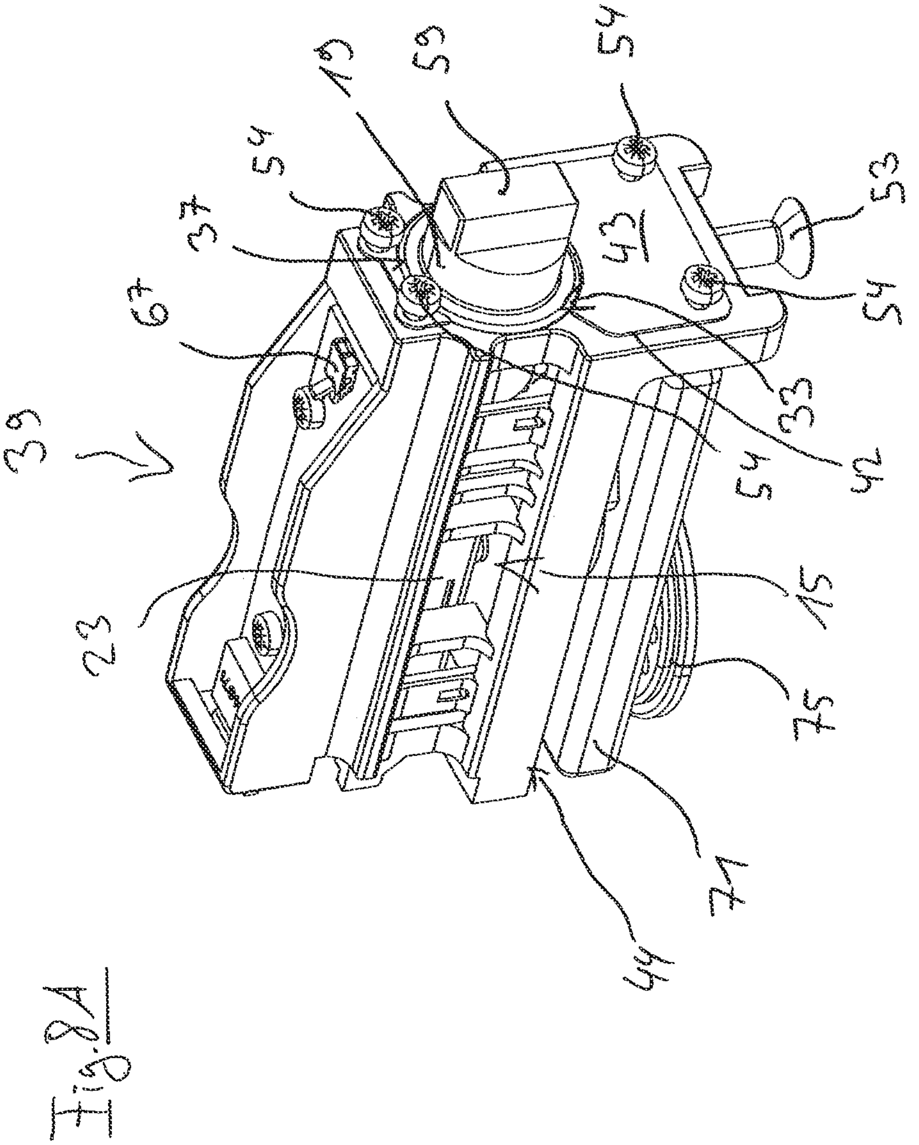
Figure 8B:
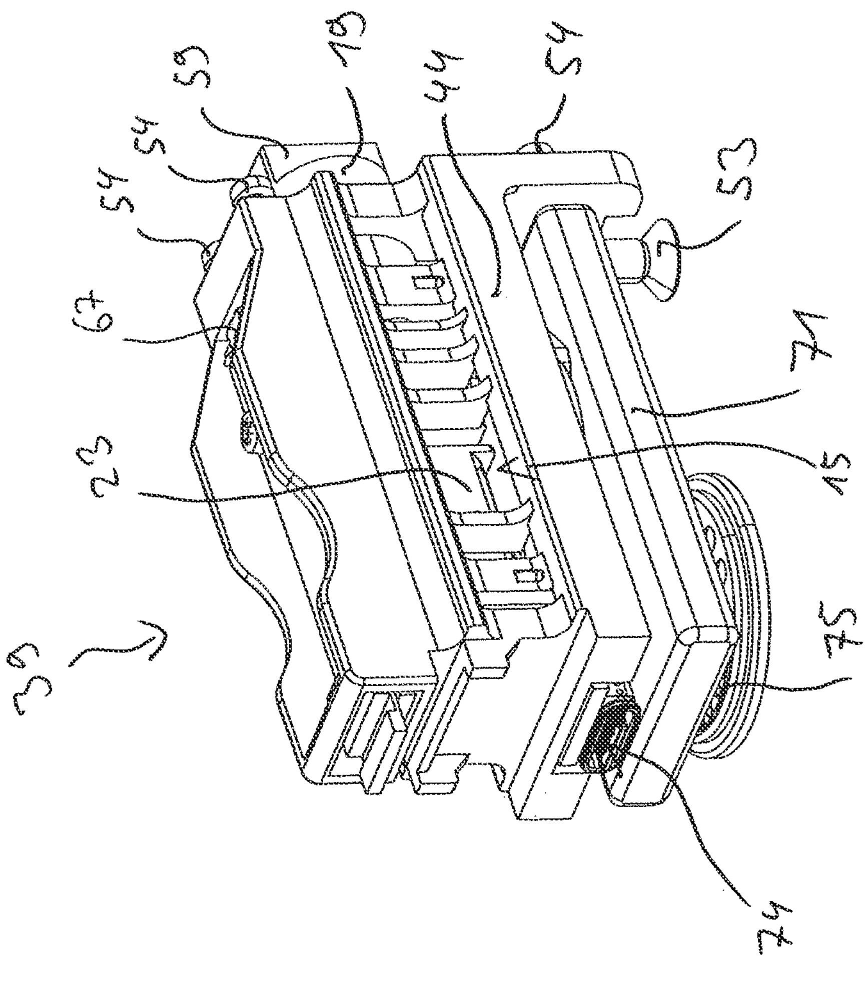
Figure 8C:
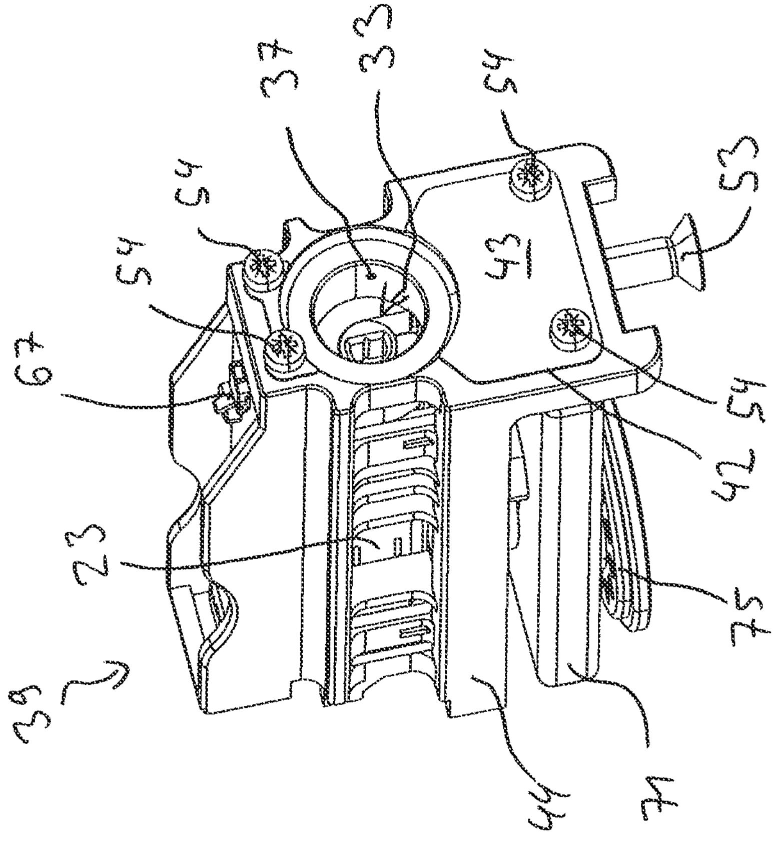
Figure 9:
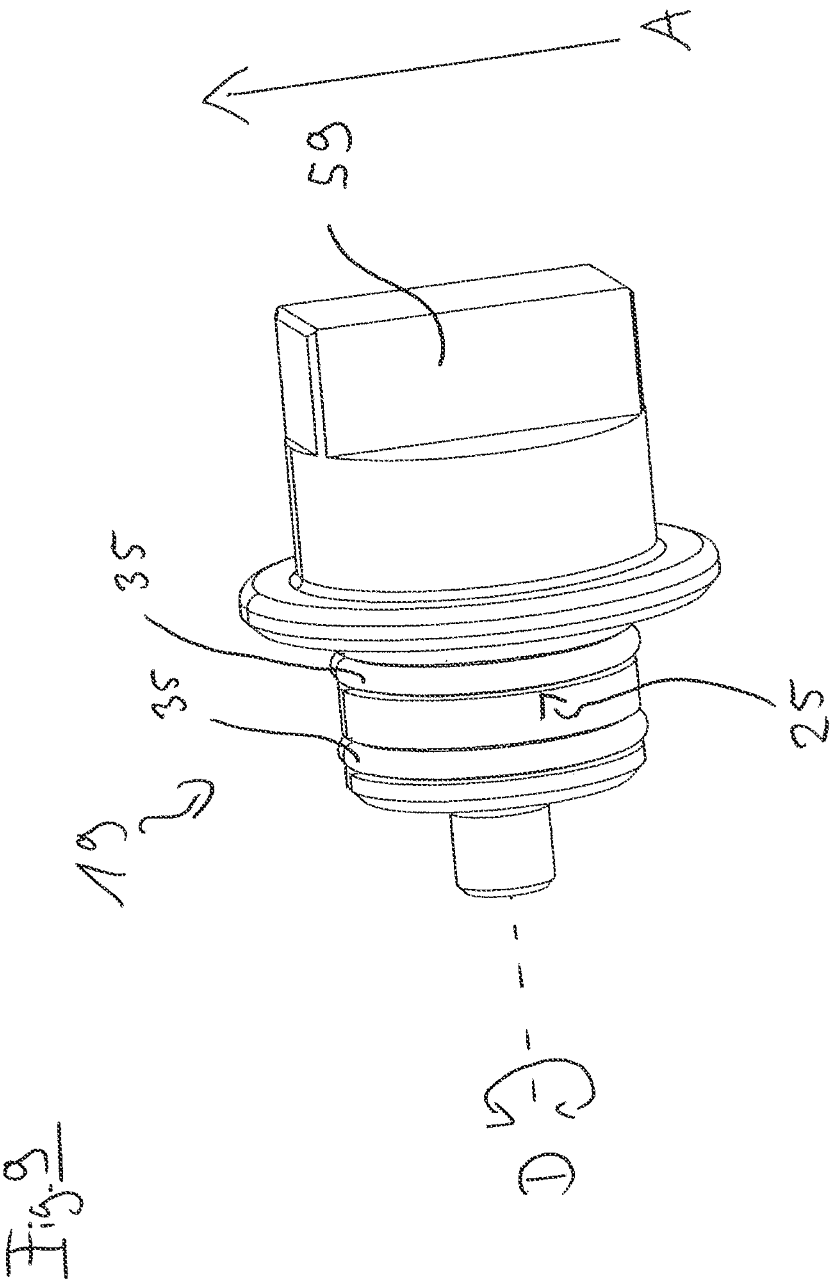
Figure 10:
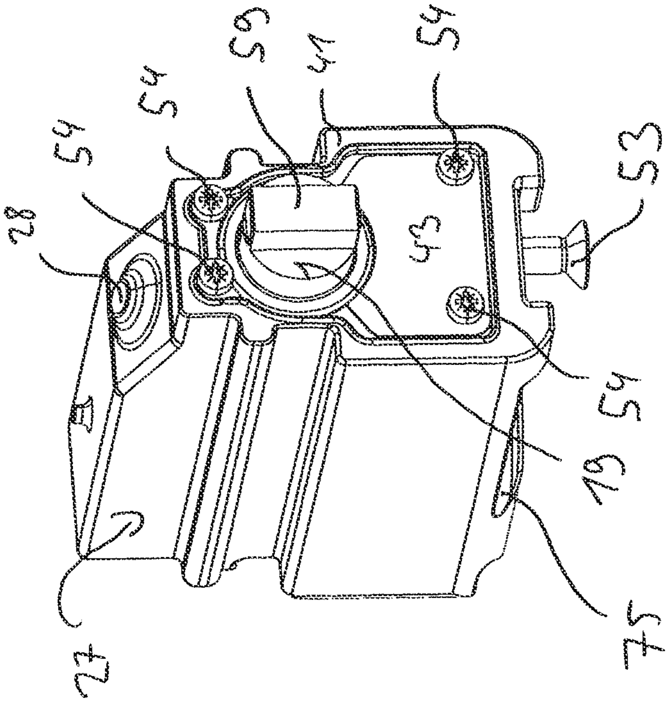
Figure 11A:
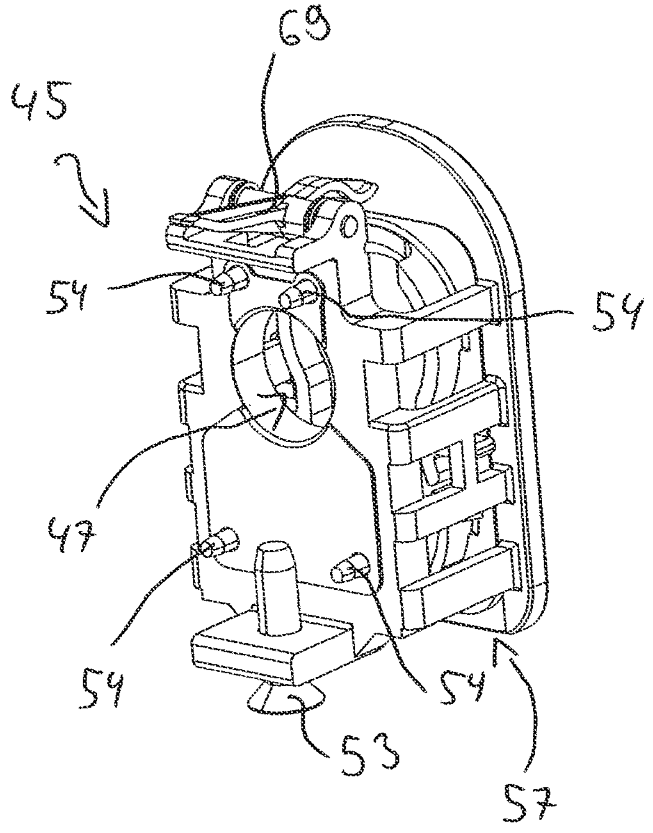
Figure 11B:
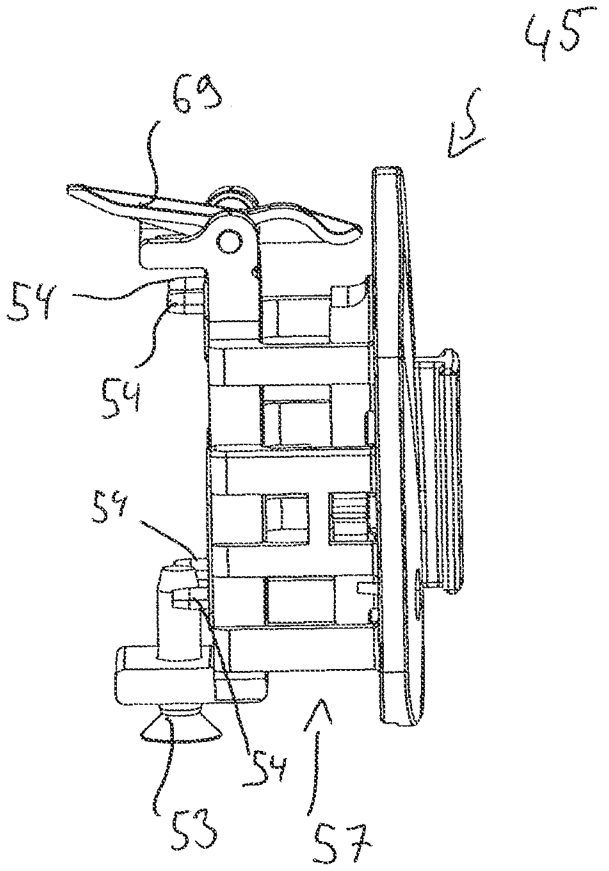
Figure 12:
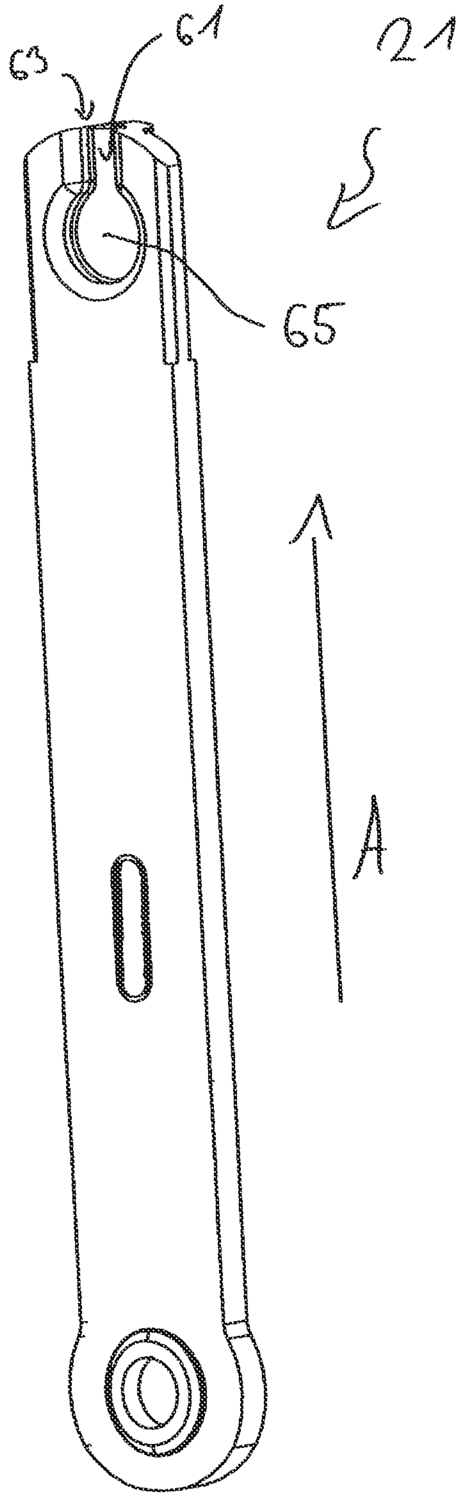

The invention will be described in the following purely by way of example with reference to an embodiment example and to the drawings. There are shown:

FIG. 1 a perspective representation of a portable hoop lock that is configured as a joint lock and that has a lock body and a hoop configured as a jointed bar hoop;

FIG. 2 a cross-sectional representation of the joint lock;

FIG. 3 an enlarged cross-sectional representation of the lock body of the joint lock;

FIG. 4 a perspective representation of the joint lock with the outer cover removed;

FIG. 5 a perspective representation of a counter connection section connected to the watertight cover with the locking bar inserted, wherein the further jointed bars of the jointed bar hoop are removed;

FIG. 6 a perspective view of the cover with the counter connection section connected;

FIGS. 7A and 7B a perspective front view and a perspective rear view of the cover;

FIGS. 8A, 8B, and 8C perspective representations of a carrier carrying a part of the locking mechanism and having a connection section with the cover removed, and indeed with a latch (FIGS. 8A and 8B) and without a latch (FIG. 8C);

FIG. 9 a perspective representation of the latch with two sealing elements configured as sealing rings for sealing the connection opening of the carrier;

FIG. 10 a perspective front view of the cover with the carrier inserted therein;

FIGS. 11A and 11B a perspective representation and a side view of the counter connection section; and FIG. 12 a perspective representation of the locking bar of the jointed bar hoop.

FIG. 1 shows a perspective representation of a portable hoop lock that is configured as a joint lock 11 and that has a lock body 13 and a jointed bar hoop 17 connected thereto. The jointed bar hoop 17 comprises a plurality of jointed bars 20 composed of metal that are pivotably connected to one another and that are connected at their ends by rivets 81 to the respective adjacent jointed bars 20. In this respect, a first end 79 of the jointed bar hoop 17 is permanently fastened to the lock body 13, while a second end of the jointed bar hoop 17 is formed by a locking section 21 of a so-called locking bar that, in the representation shown, is introduced into an introduction passage 57 of the lock body 13 and may be selectively locked to the lock body 13 or released therefrom.

To be able to comfortably handle the joint lock 11, it has an outer cover 83 that surrounds the lock body 13. This outer cover 83 may in particular be produced from a plastic to enable a pleasant gripping and holding of the joint lock 11 during the operation. Similarly, the jointed bars 20 and the locking section 21 also have respective jackets 18 composed of plastic. In addition to a more improved and more pleasant handling, in particular on a pivoting of the jointed bars 20 with respect to one another to form a loop and to secure an object, a noise formation by an abutting of the jointed bars 20 or of the locking section 21 may also be counteracted by these jackets 18.

In the representation shown, the jointed bar hoop 17 is placed in a so-called yardstick configuration in which the longitudinal axes A of the flat jointed bars 20 and of the locking section 21 (locking bar) are aligned in parallel with one another. In this configuration, the joint lock 11 may in particular be conveniently and compactly stowed during a transport.

The embodiment shown here of a portable hoop lock as a joint lock 11 merely serves for illustration while other embodiments may also be provided. For example, the hoop lock may also be configured as a U hoop lock having a rigid and substantially U-shaped hoop, or as a wire hoop lock having a wire rope hoop, or as a chain lock having a chain hoop.

FIG. 2 shows a cross-section through the joint lock 11 perspectively shown in FIG. 1. In FIG. 3, this cross-sectional representation is shown enlarged in the region of the lock body 13. As may be seen therefrom, the joint lock 11 has an electromechanical locking mechanism 15 centrally arranged in the interior of the lock body 13. This locking mechanism 15 comprises an electric motor 23 that is configured to selectively move a latch 19 into a release position or into a locking position via a drive transmission section 25 by a rotation about the axis of rotation D. While the release position of the latch 19 makes it possible to axially introduce the locking section 21 with respect to its longitudinal axis A into the introduction passage 57 of the lock body 13, the locking section 21 completely introduced into the lock body 13 may be securely locked to the lock body 13 by a transfer of the latch 19 into the locking position.

To reliably position the electric motor 23 in the interior of the lock body 13, the electric motor 23 is arranged on a carrier section 44 of a carrier 39. Furthermore, the carrier 39 has a connection section 43 that extends perpendicular to the carrier section 44 and that has a connection opening 33 within whose peripheral boundary 37 the drive transmission section 25 of the latch 19 is supported.

As may, for example, be seen from FIGS. 8A to 8C, the carrier 39 surrounds the locking mechanism 15 and is correspondingly configured as an inner housing of the joint lock 11. In this respect, the inner housing formed by the carrier 39 is, however, not completely closed, but is cage-like and, in addition to the connection opening 33, has further openings that may, for example, facilitate the insertion of the locking mechanism during an assembly of the joint lock 11.

To protect the electrical components of the electromechanical locking mechanism 15 and in particular the electric motor 23 against damage by liquid entering into the interior of the lock body 13 or by contamination, the carrier 39 is surrounded by a watertight cover 27 that is in particular elastically deformable and that may, for example, be formed from a plastic such as silicone (cf., in addition to FIGS. 2 and 3, also FIGS. 5, 6, 7A, 7B, and 10). In addition to the electric motor 23 supported by the carrier section 44 of the carrier 39, an electrical energy source 71 is further arranged within the cover 27 and provides the energy necessary for supplying the electromechanical locking mechanism. To enable a charging of this energy source 71, which is configured as an accumulator by way of example, the cover 27 has a watertight charging socket 73 such that an entry of liquid into the interior of the cover 27 through this opening, which is necessary for the permanent provision of electrical energy, may be reliably prevented.

The cover 27 further surrounds a loudspeaker 75 which is part of an alarm device not shown further and by means of which, on a detection of a break-open attempt, an acoustic signal may be transmitted through a sound exit opening 76 to alert a user or other persons in the environment to the break-open attempt. To protect the interior of the cover 27 against liquids such as rainwater possibly entering through the sound exit opening 76 or against contamination, the loudspeaker 75 may have a watertight membrane such that the sound exit opening 76 may also be sealed in a water-impermeable manner.

Furthermore, a radio module 77 is arranged within the cover 27 and may in particular be configured for a wireless reception of control commands for the electric motor 23. For this purpose, a user may, for example, transmit a command to the radio module 77 via a mobile radio connection, via a WiFi/WLAN connection, or via a Bluetooth connection, whereupon the electric motor 23 may in response to this command move the latch 19 into the desired position by a rotation about its axis of rotation D.

Furthermore, the radio module 77 may be configured to transmit information on the joint lock 11 to a user and may, for example, notify the user when the locking section 21 is securely locked to the lock body 13. Furthermore, provision may be made to transmit an alarm generated by an alarm device not only acoustically via the loudspeaker 75, but also via the radio module 77. A user who is not in the environment of the joint lock 11 may thereby also be informed of such attempts and may initiate or perform the necessary measures to preserve the object secured by the joint lock 11.

A sensor 67, which is likewise surrounded by the cover (cf. also FIGS. 8A and 8B), is arranged at the carrier 39. This sensor 67 is arranged at a section of the carrier 39 that is laterally offset with respect to the end of the introduction passage 57 of the lock body 13. The sensor 67 is configured to detect an introduction of the locking section 21 of the jointed bar hoop 17 into the introduction passage 57. To actuate the sensor 67, an actuation element 69, which is configured as a rocker, is arranged within the last part of the path which the locking section 21 of the jointed bar hoop 17 describes during an introduction. This actuation element 69 may be driven by the introduced locking section 21 to perform an actuation movement in the form of a tilting in order to mechanically contact the sensor 67 in the end position of the locking section 21 in which said locking section 21 may be locked to the lock body 13 by the latch 19.

To enable this mechanical contact, the sensor 67 is surrounded by a deformable section 28 of the cover 27 that is elastically deformed on a contact by the actuation element 69 and that exerts a force detectable by the sensor 67 onto the sensor 67 (cf. also FIGS. 5 and 7A). On a detection of the introduced locking section 21, the sensor 67 may, for example, transmit a corresponding detection signal to a control device, not shown, that may then, in particular automatically, control the locking mechanism 15 or the electric motor 23 to move the latch 19 into the locking position. Thus, a user may only completely introduce the locking section 21 into the introduction passage 57 of the lock body 13, whereupon it is automatically locked to the lock body 13 without further measures of the user being necessary. Since the cover 27 is arranged within the cover 27, the sensor 67 is also protected against water or contamination.

Due to the provision of a watertight charging socket 73 and a loudspeaker 75 having a water-impermeable membrane sealing the sound exit opening 76, the risk of an entry of liquid or contamination through one of these openings may be counteracted. Since it is, however, necessary to lock the locking section 21 of the jointed bar hoop 17 introduced into the lock body 13 outside the cover 27, the cover 27 furthermore has a cover opening 29 aligned with the connection opening 33 of the connection section 43 of the carrier 39. This enables a projection of the latch 19, which is driven by the electric motor 23, into the introduction passage 57 of the lock body 13 to be able to enter into engagement with the introduced locking section 21 of the jointed bar hoop 17 there and to be able to lock it.

To also seal the cover opening 29, the cover 27 has a clamping section 41 that peripherally surrounds the cover opening 29 and that contacts an outer side of the connection section 43 of the carrier 39 (cf. also FIGS. 7A, 8A, 8C, and 10). To connect this clamping section 41 in a water-impermeable manner to the carrier 39, the clamping section 41 of the cover 27 is clamped between the connection section 43 of the carrier 39 and a counter connection section 45 of the lock body 13.

The clamping section 41 of the cover 27 is in this respect fixedly clamped between the connection section 43 of the carrier 39 and the counter connection section 45 of the lock body 13 in that the counter connection section 45 of the lock body 13, which is also shown in FIGS. 11A and 11B, is fixedly connected to the connection section 43 of the carrier 39 by means of four screws 54 and in particular by means of a fixing element 53 that is likewise configured as a screw. Due to this fixed connection of the connection section 43 to the counter connection section 45, the clamping section 41 of the cover 27 is clamped in the gap (clamping gap 49) forming between the connection section 43 and the counter connection section 45 and is pressed via a sealing edge 42 formed at the connection section 43 (cf. also FIGS. 8A and 8C). The clamping gap 49 may thus be closed in an at least substantially water-impermeable manner by the clamping section 41, wherein the clamping section 41 of the cover 27 may in particular be elastically formed and may be compressed in the clamping gap 49 by the pressing against the connection section 43.

The counter connection section 45 of the lock body 13 further has a counter connection opening 47 that is aligned with the cover opening 29 and the connection opening 43 and whose peripheral boundary 51 supports the drive transmission section 25 of the latch 19. It may in particular be achieved by this support of the latch 19 that the latch 19 is arranged in a clearly defined position and projects into the introduction passage 57 to enable an introduction of the locking section 21 in the release position and to lock it securely in the locking position. Furthermore, the counter connection section 45 of the lock body 13 peripherally surrounds the introduced locking section 21 with respect to its longitudinal axis A such that the cage-like counter connection section 45 forms a boundary of the introduction passage 57 (cf. also FIGS. 5, 11A, and 11B). Due to this boundary, attempts may in particular be counteracted to remove the introduced and locked locking section 21 from the latch 19 and thereby to release it from the lock body 13 in an unauthorized manner.

As will further be seen from FIGS. 2 and 3, in addition to the connection of the counter connection section 45 to the connection section 43 of the carrier 39, the fixing element 53 also serves to fix the carrier 39 and the counter connection section 45 to a housing 55 of the joint lock 11 and thereby to be fixedly arranged therein. In this respect, the housing 55 may in particular be produced from metal and may, for example, be produced as a cast part that primarily serves to protect the components arranged within it against damage by a force effect during a break-open attempt (cf. also FIG. 4). Since parts of the locking mechanism 15 and in particular the electric motor 23 are supported by the carrier section 44 of the carrier 39, it may also be achieved by the fixing of the carrier 39 within the housing 55 that the locking mechanism 15 is positioned fixed within the housing 55 in a reliable manner and fastened to the housing.

Due to the water-impermeable closing of the clamping gap 49 by a clamping of the clamping section 41 of the cover 27 between the connection section 43 of the carrier 39 and the counter connection section 45 of the lock body 13, a possible penetration of water into the interior of the cover may be reliably prevented at this point. Thus, only the mutually aligned openings in the connection section 43, in the cover 27, and in the counter connection section 45, which are necessary for an exit of the latch 19 from the interior of the cover 27 and for the support of said latch 19, thus remain as a potential possibility for an entry of liquid into the interior of the cover 27.

To also close this entry into the interior of the cover 27 in a water-impermeable manner, two sealing elements 35 configured as sealing rings are arranged between the drive transmission section 25 of the latch 19 and the peripheral boundary 37 of the connection opening 33 such that the connection opening 33 is closed in a substantially water-impermeable manner by the drive transmission section 25 of the latch 19 and the two sealing elements 35 (cf. also FIGS. 8A, 8C, 9, and 10). Due to the design of the sealing elements 35 as O-rings, they are adapted to the rotational movement about the axis of rotation D performed by the latch 19 between the release position and the locking position. A permanent sealing of the connection opening 33 may hereby be achieved in both latch positions and during the movement of the latch 19.

While only the connection openings 33 are sealed by sealing elements 35 in the embodiment example shown here, provision may equally be made to arrange sealing elements 35 between the latch 19 and the peripheral boundary 51 of the counter connection opening 47 and thereby to seal the latter. In general, as is the case here, only the connection opening 33, alternatively thereto only the counter connection opening 47, or both openings 33 and 47 may be sealed in a water-impermeable manner. Likewise, differently configured sealing elements may also be provided that may, for example, be adapted to a latch that may be transferred from the locking position into the release position by a translational movement. Furthermore, it is possible to connect the cover 27 to the connection section 43 of the carrier 39 in a manner other than that shown here and to adhesively bond the cover 27 thereto in a watertight manner, for example. Accordingly, in particular the connection section 43 arranged within the cover 27 may act as a support section and its connection opening 33 may act as a support opening through which the drive transmission section 25 projects in a sealed manner.

Furthermore, provision may also be made to arrange a latch 19, which is provided for a selective locking of an introduced locking section, completely outside the cover 27 and to provide the drive transmission section 25 as a transmission element that is separate from the latch 19 and that is configured to transmit a drive power generated by the electric motor 23 within the cover 27 to the latch 19 arranged outside the cover 27.

FIGS. 4 to 12 show further perspective representations of components of the joint lock 11 to further illustrate this embodiment example.

FIG. 4 shows a perspective representation of the joint lock 11 with an outer cover 83 removed. The housing 55, to which the first end 79 of the jointed bar hoop 17 is permanently connected by means of the associated rivet 81, is arranged within said outer cover 83. Furthermore, the locking section 21 forming the second end of the jointed bar hoop 17 is introduced into the introduction passage 57 of the lock body 13 extending into the interior of the housing 55.

As FIG. 5 shows, the locking section 21 introduced axially with respect to its longitudinal axis A into the introduction passage 57 is peripherally enclosed with respect to this axis A by the counter connection section 45 that is in particular connected to the cover 27 by the fixing element 53 (cf. also FIGS. 11A and 11B). Due to this boundary of the introduction passage 57 by the counter connection section 45, the introduced locking section 21 may be secured against external access and against a moving away from the latch 19 projecting into the introduction passage 57.

Furthermore, FIG. 5 shows the arrangement of the actuation element 69, configured as a rocker, at the counter connection element 45 within the path described by the locking section 21 during an introduction into the introduction passage 57 such that, on a complete introduction of the locking section 21, the actuation element 69 may be tilted and brought into contact with the elastically deformable section 28 of the cover 27 by said locking section 21. Due to the deformation of this section 28, the sensor 67 arranged beneath this section 28 in the interior of the cover 27 may be actuated to be able to detect the introduction of the locking section 21 (cf. also FIG. 2 and FIG. 3).

As may be seen from FIG. 6, the latch 19, which may be moved from the release position shown into a locking position through a rotational movement by 90° about the axis of rotation D, also projects, and thus projects permanently, into the introduction passage 57 and the path of the introduced locking section 21 in the release position (cf. also FIG. 8A). Accordingly, the release position and the locking position only differ by the rotational position of the latch 19.

To lock the locking section 21 introduced into the lock body 13 through the mentioned rotation by 90° about the axis of rotation D, the latch 19 shown in the release position in FIG. 9 has an elongate engagement section 59 having an effective length and an effective width. In the release position, the effective length of the latch faces in the direction of the longitudinal axis A of the introduced locking section 21 that may be axially introduced with respect to its longitudinal axis into the lock body 13 (cf. also FIGS. 1, 2, 3, 4, 5, and 12).

To be able to introduce the locking section 21 shown in FIG. 12 into the introduction passage 57 of the lock body 13 even though the latch 19 projects into the path described by the locking section 21 during the introduction, the locking section 21 has a passage channel 61 that is open at a first end 63 and whose width exceeds the effective width of the engagement section 59. Through this passage channel 61, the engagement section 59 may be guided into a latch receiver 65, into which the passage channel 61 leads, in the release position of the latch 19 during an introduction of the locking section 21 into the introduction passage 57. The design of the latch receiver 65 with a clear width that is larger than the effective length of the engagement section 59 makes it possible to rotate the latch 19 and correspondingly the engagement section 59 of the latch 19 by 90° within the latch receiver 65 and to transfer the latch 19 into the locking position. In the locking position, the engagement section 59 is secured against escaping into the passage channel 61 of the locking section 21 such that the locking section 21 is locked to the lock body 13 by the engagement of the latch 19 into the latch receiver 65.

FIGS. 7A and 7B show perspective representations of the cover 27 that has the watertight charging socket 73 at a rear end and the sound exit opening 76 at a lower side. At its front end, the cover 27 has the cover opening 19 that is peripherally surrounded by the clamping section 41.

FIGS. 8A to 8C show perspective representations of the carrier 39 within which the locking mechanism 15 is at least partly arranged and which is enclosed by the cover 27 (cf. also FIG. 10). As FIG. 8C shows, the connection section 43 of the carrier 39 is arranged at the side facing the cover opening 29 and has the connection opening 33 at whose peripheral boundary 37 the drive connection section 25 formed in one part with the latch 19 is supported.

The carrier 39 and the elements of the locking mechanism 15 supported by its carrier section 44 are arranged within the cover 28 (cf. FIG. 10). To connect the clamping section 41 of the cover 27 to the connection section 43 of the carrier 39 in a water-impermeable manner, the counter connection section 45 of the lock body 13 shown in FIGS. 11A and 11B is connected to the carrier 39 by means of the screws 54 and the fixing element 53 configured as a screw. In this respect, the clamping section 41 is compressed in the clamping gap 49.

In order also to close the connection opening 33 (cf. FIG. 8C) in a watertight manner, the sealing elements 35 are provided (cf. FIG. 9). The connection opening 33 is closed and sealed in a water-impermeable manner by the drive transmission section 25 of the latch 19 and the two sealing elements 35 such that an entry of water into the interior of the cover 27 through the connection opening 33 may be counteracted.

Since the cover 27 only has a minimal number of necessary openings and they are reliably sealed, the components arranged in the interior of the cover 27 and in particular the electric motor 23 may thus be protected against damage by entering liquid or by contamination.

REFERENCE NUMERAL LIST

11 portable hoop lock, joint lock
13 lock body
15 locking mechanism
17 hoop, jointed bar hoop
18 jacket
19 latch
20 jointed bar
21 locking section
23 electric motor
25 drive transmission section
27 cover
29 deformable cover section
29 cover opening
33 support opening, connection opening
35 sealing element
37 peripheral boundary of the support opening, peripheral boundary of the connection opening
39 carrier
41 clamping section of the cover
42 sealing edge
43 support section, connection section of the carrier
44 carrier section of the carrier
45 counter connection section
47 counter connection opening
49 clamping gap
51 peripheral boundary of the counter connection opening
53 fixing element
54 screw
55 housing
57 introduction passage
59 engagement section
61 passage channel
63 first end of the passage channel
65 latch receiver
67 sensor
69 actuation element
71 electrical energy source
73 charging socket
74 charging module

75 loudspeaker
76 sound exit opening
77 radio module
79 first end of the jointed bar hoop
81 rivet
14 outer cover
A longitudinal axis of the locking section
D axis of rotation of the latch

The invention claimed is:

1. A portable hoop lock comprising a lock body that accommodates an electromechanical locking mechanism; and comprising a rigid or flexible hoop that has at least one locking section that is configured to be selectively introduced into the lock body or released from the lock body, wherein the locking mechanism comprises at least one latch and an electric motor for driving the latch, wherein the latch is configured to lock the locking section of the hoop introduced into the lock body to the lock body in a locking position and to release the locking section of the hoop for a removal from the lock body in a release position, wherein the electric motor is configured to selectively move the latch from the locking position into the release position via a drive transmission section of the locking mechanism, wherein the lock body has a watertight cover that surrounds the electric motor;

wherein the cover has a cover opening through which the drive transmission section of the locking mechanism projects in a sealed manner, wherein the lock body comprises a carrier that carries the electric motor and at least a part of the locking mechanism, wherein the carrier movably supports the drive transmission section, and wherein the carrier is surrounded by the cover, wherein the cover has a clamping section that peripherally surrounds the cover opening, wherein the carrier has a connection section that contacts an inner side of the clamping section of the cover and that has a connection opening, and wherein the lock body has a counter connection section that contacts an outer side of the clamping section of the cover and that has a counter connection opening, wherein the clamping section of the cover is arranged between the connection section of the carrier and the counter connection section of the lock body, and wherein the drive transmission section of the locking mechanism projects through the connection opening of the carrier, the cover opening, and the counter connection opening of the lock body, wherein the entire watertight cover that surrounds the electric motor is flexible.

2. A portable hoop lock in accordance with claim 1, wherein the lock body has a support section having a support opening in which the drive transmission section of the locking mechanism is movably supported and which is aligned with the cover opening, wherein the cover is held sealed in an at least substantially water-impermeable manner at the support section, and wherein at least one sealing element is arranged between the drive transmission section and a peripheral boundary of the support opening, wherein the support opening is closed and sealed in an at least substantially water-impermeable manner by the drive transmission section and the sealing element.

3. A portable hoop lock in accordance with claim 1, wherein the clamping section of the cover is arranged in a clamping gap that is formed between the connection section of the carrier and the counter connection section of the lock body, wherein the counter connection section of the lock body and the connection section of the carrier are fixed to one another in such a force-fitting manner that the clamping section of the cover is clamped in the clamping gap and the clamping gap is sealed in an at least substantially water-impermeable manner by the clamping section of the cover.

4. A portable hoop lock in accordance with claim 1, wherein the lock body has at least one sealing element that is arranged between the drive transmission section of the locking mechanism and at least one of a peripheral boundary of the connection opening of the connection section of the carrier or a peripheral boundary of the counter connection opening of the counter connection section of the lock body, wherein the connection opening or the counter connection opening is closed and sealed in an at least substantially water-impermeable manner by the drive transmission section and the sealing element.

5. A portable hoop lock in accordance with claim 1, wherein the latch is configured to be moved from the locking position into the release position by a rotation.

6. A portable hoop lock in accordance with claim 5, wherein the latch has an engagement section that has a longitudinal extent having an effective length and an effective width in a plane perpendicular to a movement axis of the latch, wherein the locking section has an elongate passage channel whose width is greater than the effective width, but less than the effective length of the engagement section of the latch, wherein the passage channel is open at a first end and leads into a latch receiver of the locking section at a second end, the clear width of said latch receiver in a direction perpendicular to a longitudinal direction of the passage channel being greater than the width of the passage channel and the effective length of the engagement section of the latch, wherein, in the release position of the latch, the elongate engagement section of the latch is oriented longitudinally to the passage channel such that, during an introduction of the locking section into the lock body, the engagement section engages into the passage channel of the locking section, but allows an introduction movement of the locking section, and wherein, in the locking position of the latch, the elongate engagement section of the latch is oriented transversely to the passage channel such that—after the locking section has been introduced into the lock body and while the engagement section engages into the latch receiver of the locking section—the engagement section is blocked against escaping into the passage channel such that the locking section is locked to the lock body.

7. A portable hoop lock in accordance with claim 1, wherein the locking mechanism has a sensor that is arranged within the cover and that is configured to detect an introduction of the locking section of the hoop into the lock body and to generate a corresponding detection signal, wherein the lock body has a movable actuation element for actuating the sensor that is configured to be brought into activating contact with the sensor by the locking section of the hoop introduced into the lock body, wherein the actuation element is arranged outside the cover.

8. A portable hoop lock in accordance with claim 7, wherein the actuation element is configured to be driven to perform an actuation movement by the locking section of the hoop introduced into the lock body and to mechanically contact the sensor through the cover in order to bring about the generation of the detection signal.

9. A portable hoop lock in accordance with claim 7, wherein the sensor is connected to a control device that is configured to control the electric motor to move the latch into the locking position in response to the generated detection signal.

10. A portable hoop lock in accordance with claim 1, wherein the locking mechanism comprises an electrical energy source that is arranged within the cover, wherein the cover has a watertight charging socket for charging the electrical energy source.

11. A portable hoop lock in accordance with claim 1, wherein the lock body comprises at least one of:

an alarm device for generating an acoustic alarm signal that is at least partly arranged within the cover and that comprises a loudspeaker for outputting the alarm signal, or a radio module that is at least partly arranged within the cover and that is configured to wirelessly receive control commands for the electric motor.

12. A portable hoop lock in accordance with claim 1, wherein the portable hoop lock is configured as a joint lock and the hoop is configured as a jointed bar hoop that has a plurality of jointed bars pivotably connected to one another, wherein a first end of the jointed bar hoop is permanently fastened to the lock body and the locking section forms a free second end of the jointed bar hoop that is configured to be selectively locked to or released from the lock body.

13. A portable hoop lock in accordance with claim 1, wherein the cover is elastically deformable.

14. A portable hoop lock in accordance with claim 5, wherein the latch is configured to be moved from the locking position into the release position by a rotation about 90°.

15. A portable hoop lock comprising a lock body that accommodates an electromechanical locking mechanism; and comprising a rigid or flexible hoop that has at least one locking section that is configured to be selectively introduced into the lock body or released from the lock body, wherein the locking mechanism comprises at least one latch and an electric motor for driving the latch, wherein the latch is configured to lock the locking section of the hoop introduced into the lock body to the lock body in a locking position and to release the locking section of the hoop for a removal from the lock body in a release position, wherein the electric motor is configured to selectively move the latch from the locking position into the release position via a drive transmission section of the locking mechanism, wherein the lock body has a watertight cover that surrounds the electric motor wherein the cover has a cover opening through which the drive transmission section of the locking mechanism projects in a sealed manner, wherein the lock body comprises a carrier that carries the electric motor and at least a part of the locking mechanism, wherein the carrier movably supports the drive transmission section, and wherein the carrier is surrounded by the cover, wherein the cover has a clamping section that peripherally surrounds the cover opening, wherein the carrier has a connection section that contacts an inner side of the clamping section of the cover and that has a connection opening, and wherein the lock body has a counter connection section that contacts an outer side of the clamping section of the cover and that has a counter connection opening, wherein the clamping section of the cover is arranged between the connection section of the carrier and the counter connection section of the lock body, and wherein the drive transmission section of the locking mechanism projects through the connection opening of the carrier, the cover opening, and the counter connection opening of the lock body, and wherein the counter connection section of the lock body is fixed to the connection section of the carrier by means of a fixing element, wherein the lock body comprises a housing that surrounds the cover, wherein the carrier and the counter connection section are fixed in or at the housing by the fixing element.

16. A portable hoop lock comprising a lock body that accommodates an electromechanical locking mechanism; and comprising a rigid or flexible hoop that has at least one locking section that is configured to be selectively introduced into the lock body or released from the lock body, wherein the locking mechanism comprises at least one latch and an electric motor for driving the latch, wherein the latch is configured to lock the locking section of the hoop introduced into the lock body to the lock body in a locking position and to release the locking section of the hoop for a removal from the lock body in a release position, wherein the electric motor is configured to selectively move the latch from the locking position into the release position via a drive transmission section of the locking mechanism, and wherein the lock body has a watertight cover that surrounds the electric motor, wherein the cover has a cover opening through which the drive transmission section of the locking mechanism projects in a sealed manner, wherein the lock body comprises a carrier that carries the electric motor and at least a part of the locking mechanism, wherein the carrier movably supports the drive transmission section, and wherein the carrier is surrounded by the cover, wherein the cover has a clamping section that peripherally surrounds the cover opening, wherein the carrier has a connection section that contacts an inner side of the clamping section of the cover and that has a connection opening, and wherein the lock body has a counter connection section that contacts an outer side of the clamping section of the cover and that has a counter connection opening, wherein the clamping section of the cover is arranged between the connection section of the carrier and the counter connection section of the lock body, and wherein the drive transmission section of the locking mechanism projects through the connection opening of the carrier, the cover opening, and the counter connection opening of the lock body, and wherein the counter connection section of the lock body peripherally surrounds the introduced locking section of the hoop with respect to a longitudinal axis of said locking section.

* * * * *